March 27, 1934.  H. T. FAUS  1,952,161
MEASURING INSTRUMENT
Filed March 15, 1933

Inventor:
Harold T. Faus,
by Charles E. Tullar
His Attorney.

Patented Mar. 27, 1934

1,952,161

UNITED STATES PATENT OFFICE 1,952,161

MEASURING INSTRUMENT

Harold T. Faus, Lynn, Mass., assignor to General Electric Company, a corporation of New York Application March 15, 1933, Serial No. 660,814

10 Claims. (Cl. 171—95)

My invention relates to measuring and indicating instruments and has for its principal object the provision of a simple, inexpensive construction for a sensitive, sturdy, reliable instrument having a very light movable member.

It is an object of my invention to provide an inexpensive mounting for the movable member which is rugged and capable of withstanding vibration, but which has relatively low friction.

Another object of my invention is the provision of a magnetic suspension which serves both to suspend the movable member axially and to bias it to give angular zero or neutral position. Other and further objects and advantages will become apparent as the description proceeds.

In accordance with my invention in its preferred form, the movable member of the instrument is pivoted about a taut wire, fiber, or other type of filament. The elements of the movable member are attached to a glass tube which has its ends contracted by fusion to form relatively low friction bearings surrounding the taut filament. The cooperating stationary and movable elements producing the instrument torque may be of any desired type. In order to maintain the movable member in the desired axial position, a magnetic suspension is provided. This suspension consists of a flat disk of magnetic material attached to the movable member coaxial therewith and a stationary magnet having poles between which said disk is suspended. The disk is provided with one or more projections along a diameter which will be substantially parallel to the direction of the magnetic field between the poles of the suspension magnet when the movable member is in its neutral or zero position, thereby providing a control torque and eliminating the necessity for biasing springs.

Figure 1:
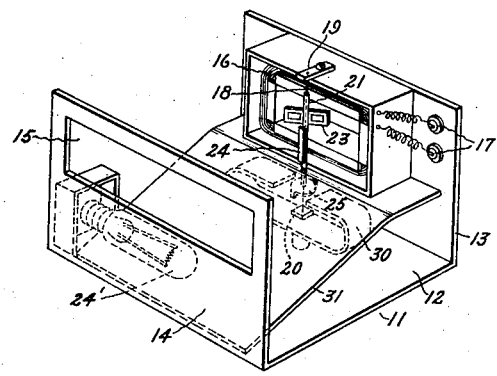
Figure 2:
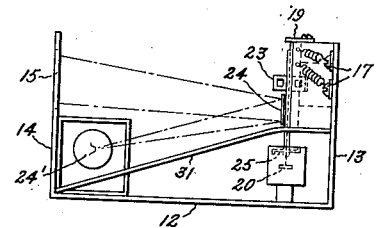
Figure 4:
Figure 3:
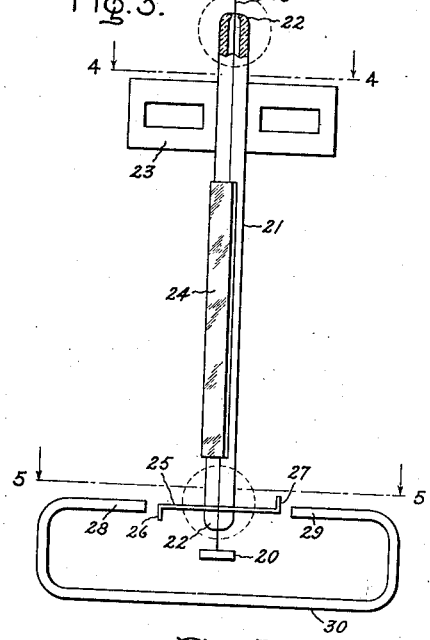
Figure 6:
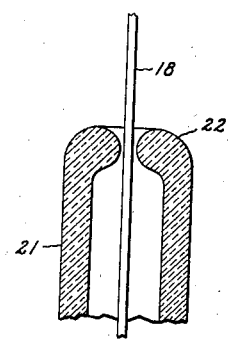
Figure 5:
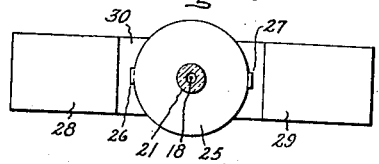

The features of my invention which I believe to be novel and patentable will be pointed out in the claims appended hereto. A better understanding of my invention itself however may be obtained by referring to the following description in connection with the accompanying drawing in which Fig. 1 represents in perspective with its cover removed one form of instrument constructed in accordance with my invention; Fig. 2 is a side elevation of the instrument illustrated in Fig. 1; Fig. 3 is an elevation of a portion of the instrument showing the movable member and the magnetic suspension and control arrangement; Figs. 4 and 5 are cross-sectional views seen from above, taken at planes 4 and 5 respectively in Fig. 3; and Fig. 6 is a partial cross-sectional view showing more in detail the upper bearing of the instrument.

Referring now more in detail to the drawing in which like reference characters refer to like parts throughout, I have shown an instrument mounted on a frame 11 having a base portion 12, a back 13, and a front plate 14 having an opening for a translucent screen 15. For clarity the instrument is shown with the cover removed. For the sake of illustration I have shown an electrical instrument of the deflecting light-beam type in which the instrument torque is produced by the reaction between a stationary current-conducting coil and a movable magnetic actuating vane, but it will be understood that my invention is not limited to instruments of this type.

A stationary current-conducting coil 16 is supported by the back 13, and the current or voltage to be measured is applied through the terminals 17. A taut filament 18 composed of bronze wire, quartz fiber, or any other suitable material is supported between brackets 19 and 20 to form an axis for the movable member of the instrument.

The elements of the movable member are attached to a cylinder 21 which surrounds the taut wire 18 and may be composed of glass, quartz, or other suitable vitreous material or a material readily acquiring a hard smooth surface. Both ends of the glass cylinder 21 are contracted as by fusion to form contracted portions 22 which closely surround the taut wire 18 and serve as relatively low-friction side-thrust bearings. The torque-producing element of the movable member in the type of instrument illustrated comprises an actuating vane 23 composed of magnetic material which is attached in any suitable manner to the glass tube 21. The glass tube 21 also carries a mirror 24 which reflects a beam of light produced by the light source 24' against the translucent screen 15 to produce a spot of light which travels across the screen in response to variations in the magnitude of the quantity measured.

The movable member also carries at its lower end a disk 25 composed of magnetic material and having projections 26 and 27, preferably placed at opposite ends of a diameter of the disk and which may, if desired, extend in opposite directions parallel to the axis of the movable member. The disk 25 is suspended between and substantially parallel with the direction of the magnetic field between poles 28 and 29 of a stationary magnet 30 which may, if desired, be a permanent magnet.

In employing this mounting arrangement for electrical instruments, it is preferable to provide a magnetic shield 31 composed of soft iron or other suitable material between the suspension disk 25 and the torque-producing elements 16 and 23.

Since magnetic materials such as soft-iron, of which the suspension disk would be composed, are also conductors of electricity, although of relatively high resistance, and since the suspension disk 25 rotates in a magnetic field, there would be some tendency for the damping of oscillations of the movable member by eddy currents set up in disk 25. This damping effect may be augmented, if desired, by placing a drop of oil in the tube 22.

The reaction between the direct current or alternating current, as the case may be, flowing in the coil 16 and the vane 23 magnetized by said current provides an instrument torque in a manner well understood by those skilled in the art. It will also readily be understood that the magnetic attraction between the disk 25 and the poles 28 and 29 of the magnet 30 serves to suspend the movable member in such an axial position that the disk 25 remains between the pole 28 and 29. The suspension of the movable member is obviously independent of its angular position since the disk 25 is substantially circular in shape. However the presence of the projections 26 and 27 tends to bias the movable member to an angular position in which the projections 26 and 27 lie along a diameter substantially parallel to the direction of the field between the poles 28 and 29, since there is also an attraction between poles 28 and 29 and projections 26 and 27, the moment of which increases as the movable member is deflected from its neutral or zero position.

Since the side thrust bearings 22 are formed by contraction of the ends of a piece of glass tubing and are integral with the tube 21, great simplicity of construction is afforded, and the expense and labor of inserting additional parts to form bearings is thereby avoided.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. An electrical instrument having a stationary member comprising a current-conducting coil, a suspension magnet with a pair of polar projections and a taut filament forming an axis for said instrument, and having a movable member comprising a tube of vitreous material with contracted ends surrounding said taut filament to form low friction bearings, an actuating vane supported by said tube and reacting with said stationary coil to produce an instrument torque, and a control vane in the form of a disk with diametrically opposite laterally extending projections, said control vane being attached to and coaxial with said tube, being placed between the polar projections of said suspension magnet, and being substantially parallel to the magnetic field between the polar projections of said magnet and cooperating therewith to bias said movable element to a given angular position and to suspend said movable element in a predetermined position along its axis.

2. An electrical instrument comprising in combination a stationary element, a rotatably movable element cooperating therewith to provide an instrument torque, a stationary magnet having pole portions symmetrical with respect to the axis of said instrument, a control vane between the pole portions of said magnet and cooperating therewith to provide a suspension for said movable element and to bias the same to a given angular position, a taut filament supported by the stationary member forming an axis for said instrument, and a vitreous tube with contracted ends integral therewith surrounding said taut filament and supporting said movable element and said control vane to form low-friction side-thrust bearings.

3. A suspension for a measuring instrument comprising a relatively taut filament fixedly supported, a tube of vitreous material with contracted ends integral therewith surrounding said filament and forming relatively low friction guides for maintaining axial alinement, said tube being adapted to support a movable element of said measuring instrument, a disk of magnetic material attached to said tube coaxial therewith, and a magnet suspending said disk by magnetic attraction in a given longitudinal position along its axis, said disk being between the pole portions of said magnet and substantially parallel to the magnetic field therebetween.

4. In a measuring instrument having a movable element, a combined control means and suspension comprising bearings for the movable element of said instrument arranged to take side thrust but offering no opposition to axial movement, a disk of magnetic material attached to said movable element coaxial therewith, and a magnet having pole portions between which said disk is magnetically suspended with its plane substantially parallel with the magnetic field between said pole portions, said disk having laterally extending projections at opposite ends of a diameter thereof serving to bias said movable element to a position in which the diameter of said disk through said projections is substantially parallel with the magnetic field between the pole portions of said magnet.

5. In a measuring instrument having a movable element, a combined control means and suspension comprising bearings for the movable element of said instrument arranged to take side thrust but offering no opposition to axial movement, a disk of magnetic material attached to said movable element coaxial therewith, and a magnet having pole portions between which said disk is magnetically suspended with its plane substantially parallel with the magnetic field between said pole portions, said disk having a laterally extending projection near its periphery serving to bias said movable element to a position in which the radius of said disk through said projection is substantially parallel with the magnetic field between the pole portions of said magnet.

6. In a measuring instrument having a moving element constrained to rotate about and move along a fixed axis, a combined control means and suspension for said movable element comprising a disk of magnetic material attached to said movable element coaxial therewith, and a magnet having pole portions between which said disk is magnetically suspended with its plane substantially parallel with the magnetic field between said pole portions, said disk having a pair of lateral projections extending in opposite directions parallel to the axis of said disk and located at opposite ends of a diameter of said disk serving to bias said movable element to a position in which the diameter of said disk through said projections is substantially parallel with the magnetic field between the pole portions of said magnet.

7. In a measuring instrument having a moving element constrained to rotate about and move along a fixed axis, a combined control means and suspension for said movable element comprising a disk of magnetic material attached to said movable element coaxial therewith, and a magnet having pole portions between which said disk is magnetically suspended with its plane substantially parallel with the magnetic field between said pole portions, said disk being formed to bias said movable element to a given angular position.

8. In a measuring instrument having a moving element constrained to rotate about and move along a fixed axis, a combined control means and suspension for said movable element comprising a disk of magnetic material attached to said movable element coaxial therewith, and a magnet having pole portions between which said disk is magnetically suspended with its plane substantially parallel with the magnetic field between said pole portions, said disk having a pair of projections at opposite ends of a diameter thereof serving to bias said movable element to a position in which the diameter of said disk through said projections is substantially parallel with the magnetic field between the pole portions of said magnet.

9. A measuring instrument comprising a stationary element, a taut filament fixed in position and forming an axis for said instrument, a movable member including an element cooperating with said stationary element to produce an instrument torque, a tube of vitreous material having contracted ends surrounding said taut filament carrying said movable element, a mirror attached to said tube and a disk of magnetic material attached to and coaxial with said tube, a stationary magnet having pole portions between which said disk is suspended, said disk having projections cooperating with said magnet to bias said movable member to a position in which the diameter of said disk through said projections is substantially parallel to the magnetic field between the pole portions of said suspension magnet, a source of light cooperating with said mirror to produce a deflecting beam, and a screen cooperating therewith to provide an indication of the angular position of said movable member, thereby obtaining a movable member of great lightness.

10. In a measuring instrument having a movable element, a combined control means and suspension for the movable element thereof comprising a relatively taut filament fixedly supported, a tube of vitreous material with contracted ends integral therewith surrounding said filament to form side thrust guides, said tube being adapted to support said movable element, a disk of magnetic material attached to said movable element coaxial therewith, and a magnet having polar projections between which said disk is magnetically suspended with its plane substantially parallel with the magnetic field between said polar projections, said disk being formed to bias said movable element to a given angular position.

HAROLD T. FAUS.